US012618512B2

(12) United States Patent
    Rickard

(10) Patent No.: US 12,618,512 B2
(45) Date of Patent: May 5, 2026

(54) FENCE MOUNTED SHELVING DEVICE

(71) Applicant: Brian Rickard, Lake Ronkonkoma, NY (US)

(72) Inventor: Brian Rickard, Lake Ronkonkoma, NY (US)

( * ) Notice: Subject to any disclaimer, the term of this patent is extended or adjusted under 35 U.S.C. 154(b) by 278 days.

(21) Appl. No.: 18/388,221

(22) Filed: Nov. 9, 2023

(65) Prior Publication Data

US 2025/0155078 A1    May 15, 2025

(51) Int. Cl.
    *F16M 13/02*      (2006.01)
    *A47F 5/00*       (2006.01)
    *E04H 17/20*      (2006.01)
    *E04H 17/24*      (2006.01)

(52) U.S. Cl.
    CPC ......... *F16M 13/025* (2013.01); *A47F 5/0043* (2013.01); *E04H 17/20* (2013.01); *E04H 17/24* (2013.01)

(58) Field of Classification Search
    CPC ............ E04H 17/1447; E04H 17/1448; E04H 17/1473; E04H 17/1488; E04H 17/10; E04H 17/124; E04H 17/20; E04H 17/24; F16B 2/08
    See application file for complete search history.

(56) References Cited

U.S. PATENT DOCUMENTS 3,930,637 A * 1/1976 Davis ..................... E04H 17/10
                                                    52/418
    4,049,126 A   9/1977 Halverson 5,443,234 A   8/1995 Woods
    5,655,740 A * 8/1997 Lazarus ................. A47B 57/30
                                                    248/303
    5,785,447 A * 7/1998 Fonti ................... E04H 17/1413
                                                    403/396
    6,386,519 B1 * 5/2002 Priefert ............... E04H 17/1413
                                                    256/1
    6,715,725 B2   4/2004 Chipka
    D584,832 S    1/2009 Smith
    7,740,143 B2   6/2010 White
    7,784,744 B2 * 8/2010 Becker ................. F16L 3/2235
                                                    248/68.1
    9,512,633 B2 * 12/2016 Marron ............... E04H 17/1488
                    (Continued)

FOREIGN PATENT DOCUMENTS

DE        2552394 B1 *  2/1977
    FR        3041017 B1 * 10/2017
                    (Continued)

*Primary Examiner* — Jonathan P Masinick

(57) ABSTRACT

A fence mounted shelving device for attaching shelving to fence posts includes a fence having a first fence post and a second fence post each being mounted within and extending upwardly from a ground surface. A shelving unit is coupled to the first and second fence posts. The shelving unit includes a shelf rod having a first end portion and a second end portion. A first bracket is coupled to a second bracket around a respective one of the first and second fence posts thereby forming a fence mount. The fence mount is coupled to the first end portion of the shelf rod such that the shelf rod extends outwardly from the respective one of the first and second fence posts over the ground surface. A platform that extends between the first and second fence posts is positionable on the shelf rod.

20 Claims, 9 Drawing Sheets

(56)        References Cited

U.S. PATENT DOCUMENTS

| 9,763,519 | B1 * | 9/2017 | Suhar .................... A47B 96/061 |
| 9,993,074 | B1 * | 6/2018 | Osecki ..................... B25H 1/00 |
| 10,422,155 | B2 * | 9/2019 | Goedecke ........... E04H 17/1417 |
| 11,371,256 | B1 * | 6/2022 | Lyons ................. E04H 17/1417 |
| 11,560,733 | B2 * | 1/2023 | Volin ...................... E04H 15/44 |
| 11,771,220 | B1 * | 10/2023 | Brooks .................. A47B 51/00 |
| | | | 312/319.7 |
| 11,879,262 | B2 * | 1/2024 | Centoni .................. E04H 17/23 |
| 2007/0080333 | A1 * | 4/2007 | Perry ................. E04H 17/1413 |
| | | | 256/67 |
| 2011/0174945 | A1 | 7/2011 | Wood |
| 2014/0205367 | A1 * | 7/2014 | Sung ...................... F16B 9/052 |
| | | | 403/192 |
| 2015/0252941 | A1 * | 9/2015 | Sirkin ................. E04H 17/1417 |
| | | | 248/219.4 |
| 2019/0183246 | A1 * | 6/2019 | Bernic ................. A47B 96/068 |
| 2022/0248849 | A1 * | 8/2022 | Crecco ................... A47B 96/06 |

FOREIGN PATENT DOCUMENTS

| GB | DB164213 | | 6/1921 | |
| GB | 2401382 | A * | 11/2004 | ............. A47G 7/045 |
| KR | 20070037015 | A * | 4/2007 | ............... F16B 2/08 |
| KR | 20080002704 | A * | 1/2008 | ............... H02B 5/02 |
| KR | 100924281 | B1 * | 10/2009 | ............... F16L 3/14 |
| KR | 20100110709 | A * | 10/2010 | ........... F16L 3/1025 |
| KR | 100990496 | B1 * | 11/2010 | ............. A47C 11/00 |
| KR | 20120014287 | A * | 2/2012 | ............... F16L 3/14 |
| KR | 20120094793 | A * | 8/2012 | ........... F16L 3/1008 |

* cited by examiner

FENCE MOUNTED SHELVING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to shelving systems and more particularly pertains to a new shelving system for attaching shelving to fence posts.

(2) Description of Related Art Including Information Disclosed Under 37 CFR 1.97 and 1.98

The prior art relates to shelving systems. Some shelving systems are free-standing devices that can be used to store items. Other shelving systems are designed for attachment to a fence. These fence-attached shelving systems can be hung or installed on the fabric, mesh, or rails of the fence between fence posts. However, the fabric of the fence post is unable to support a substantial amount of weight because the fabric is typically not rigid and is not mounted or cemented into the ground. Instead, the fence posts provide most of the rigidity of the fence and are firmly mounted in the ground. For example, with chain link fences, particularly those surrounding commercial buildings, the fence posts are typically cemented into the ground. Thus, there is a need in the art for a fencing system that can be mounted to fence posts for supporting and storing items along a fence line.

BRIEF SUMMARY OF THE INVENTION

An embodiment of the disclosure meets the needs presented above by generally comprising a fence having a first fence post and a second fence post each being mounted within and extending upwardly from a ground surface. A shelving unit is coupled to the first and second fence posts. The shelving unit extends outwardly from the fence whereby the shelving unit is configured to support a weight of an object over the ground surface between the first and second fence posts. The shelving unit further comprises a shelf rod having a first end portion and a second end portion. A first bracket is coupled to a second bracket around a respective one of the first and second fence posts thereby forming a fence mount. The fence mount is coupled to the first end portion of the shelf rod such that the shelf rod extends outwardly from the respective one of the first and second fence posts over the ground surface. A platform is positionable on the shelf rod. The platform extends between a first shelf rod extending outwardly from the first fence post and a second shelf rod extending outwardly from the second fence post. The platform is configured to hold the object.

The first bracket may generally include an inner side, an outer side, a first bracket coupling portion, a first curved portion, and a first rod coupling portion. The first curved portion is between the first bracket coupling portion and the first rod coupling portion. The second bracket may generally include an interior side, an exterior side, a second bracket coupling portion, a second curved portion, and a second rod coupling portion. The second curved portion is between the second bracket coupling portion and the second rod coupling portion. The first and second curved portions encircle the respective one of the first and second fence posts such that the first and second bracket coupling portions are positioned together and such that the first and second bracket coupling portions are positioned together. A stop is coupled to the first bracket coupling portion to retain the first bracket coupling portion against the second bracket coupling portion.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description refers to the annexed drawings wherein.

DETAILED DESCRIPTION OF THE INVENTION

Figure 1:
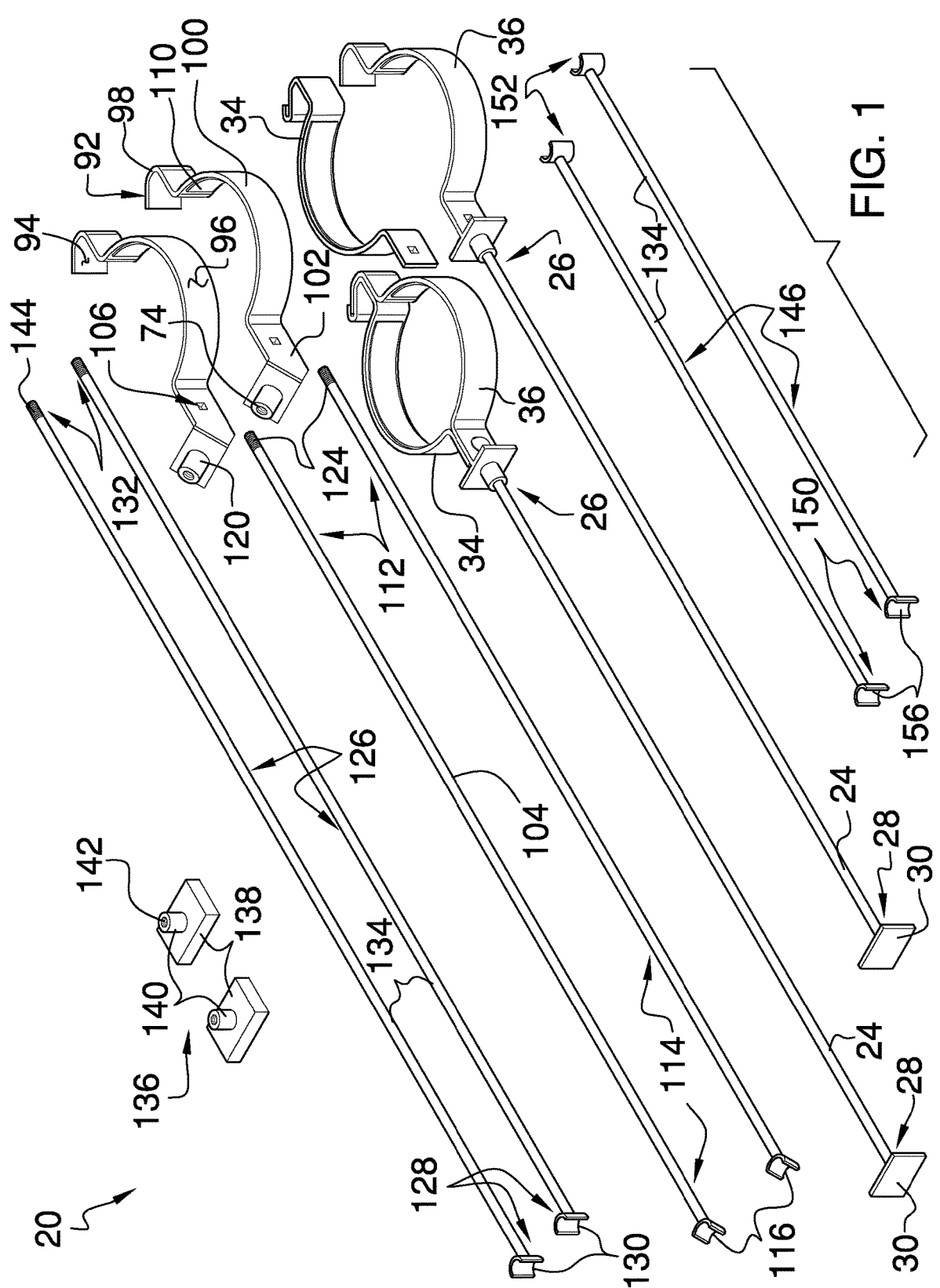
FIG. 1 is an isometric view of a fence mounted shelving device according to an embodiment of the disclosure.

With reference now to the drawings, and in particular to FIGS. 1 through 11 thereof, a new shelving system embodying the principles and concepts of an embodiment of the disclosure and generally designated by the reference numeral 10 will be described.

As best illustrated in FIGS. 1 through 11, the fence mounted shelving device 10 generally comprises a fence 12 having a first fence post 14 and a second fence post 16 each being mounted within and extending upwardly from a ground surface 18. The first fence post 14 is generally spaced from the second fence post 16.

A shelving unit 20 is coupled to the first 14 and second 16 fence posts. The shelving unit 20 extends outwardly from the fence 12 whereby the shelving unit 20 is configured to support a weight of an object 22 over the ground surface 18 between the first 14 and second 16 fence posts.

Figure 5:
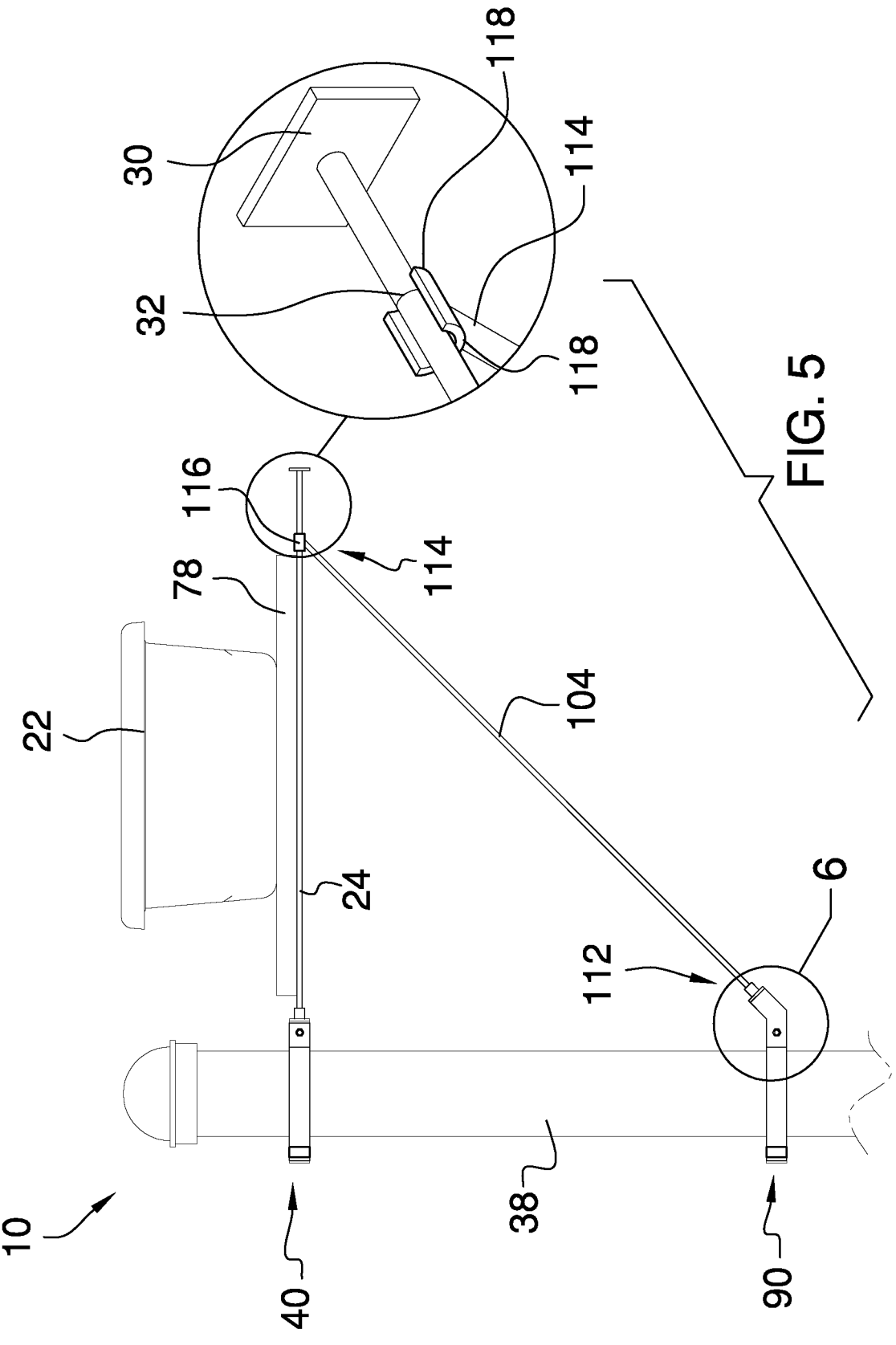
FIG. 5 is an in-use view of an embodiment of the disclosure.

The shelving unit 20 includes a shelf rod 24 having a first end portion 26 and a second end portion 28. The shelf rod 24 may include a plate 30 that is coupled to the second end portion 28. The plate 30 may extend outwardly from the shelf rod 24, for example being a square or rectangular shape as shown in FIG. 1. As shown in FIG. 5, the shelf rod 24 may be coupled to the approximate midpoint of the plate 30.

Figure 2:
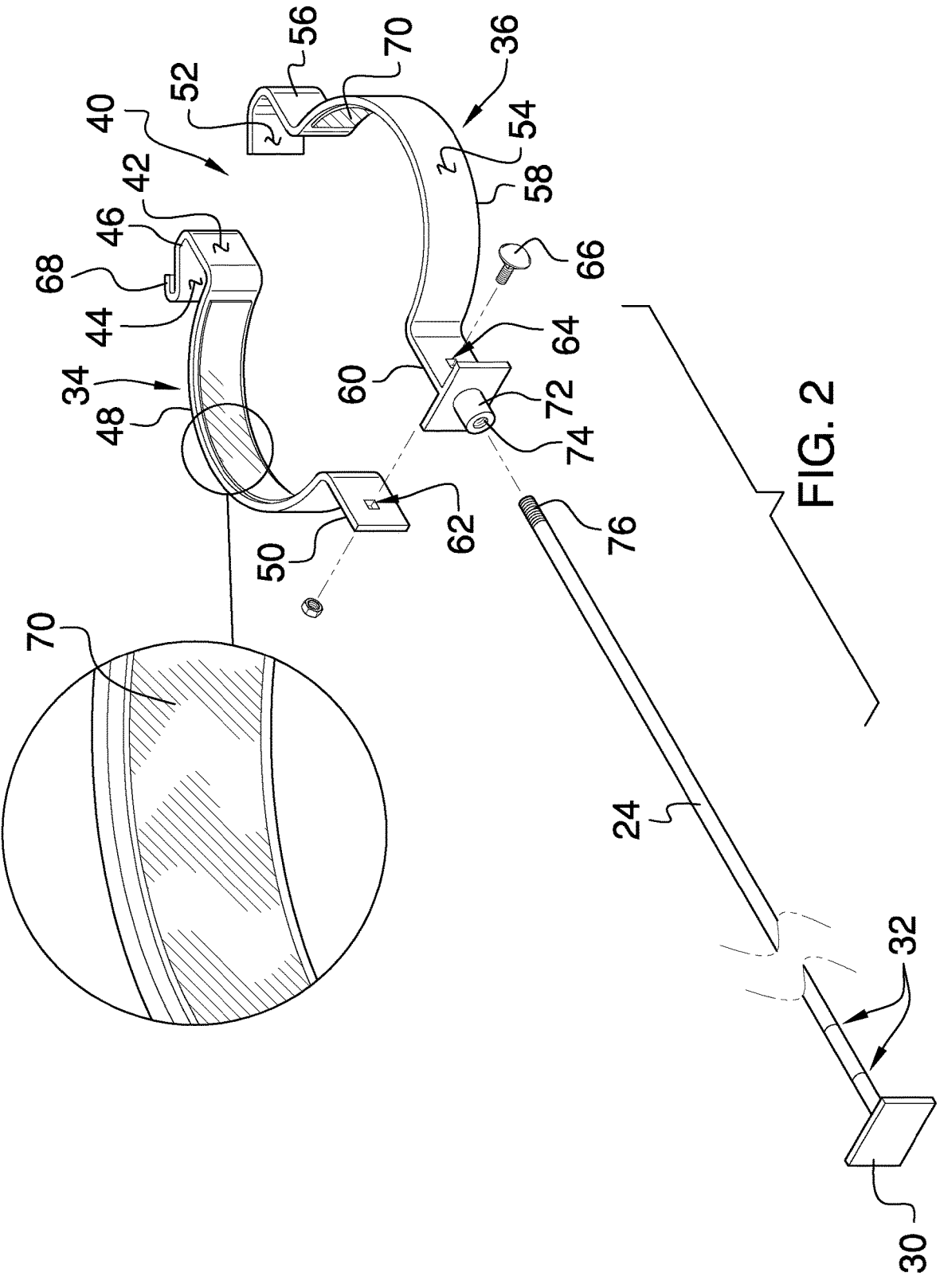
FIG. 2 is an exploded view of an embodiment of the disclosure.
Figures 3, 4:
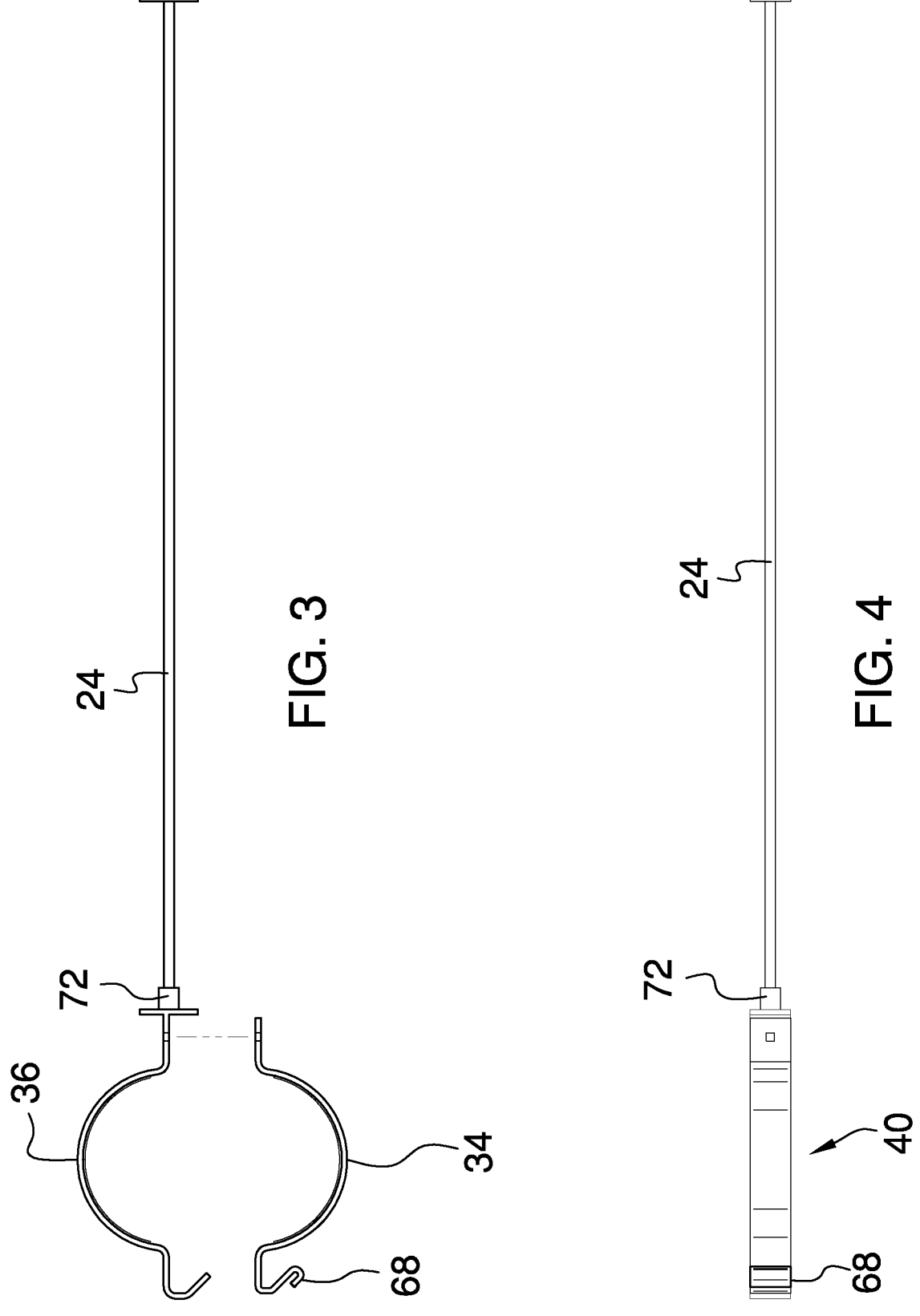
FIG. 3 is a top view of an embodiment of the disclosure.
FIG. 4 is a side view of an embodiment of the disclosure.

The second end portion 26 may also have a plurality of notches 32, as shown in FIGS. 2 and 5. Each of the plurality of notches 32 is spaced from the others along a length of the shelf rod 24. In some embodiments, each of the plurality of notches 32 may be spaced from the others by between 1.0 inches and 3.0 inches. For example, an innermost one of the plurality of notches 32 may be positioned between 7.0 and 9.0 inches from the first end portion 26 while an outermost one of the plurality of notches 32 may be positioned between 11.0 and 13.0 inches from the first end portion 26. The outermost one of the plurality of notches 32 is generally adjacent to the plate 30.

A first bracket 34 is coupled to a second bracket 36. The first 34 and second 36 brackets are coupled together around a respective one of the first and second fence posts 38 thereby forming a fence mount 40. The fence mount 40 is coupled to the first end portion 26 of the shelf rod 24 such that the shelf rod 24 extends outwardly from the respective one of the first and second fence posts 38 over the ground surface 18.

The first bracket 34 has an inner side 42, an outer side 44, a first bracket coupling portion 46, a first curved portion 48, and a first rod coupling portion 50. The first curved portion 48 is between the first bracket coupling portion 46 and the first rod coupling portion 50.

The second bracket 36 has an interior side 52, an exterior side 54, a second bracket coupling portion 56, a second curved portion 58, and a second rod coupling portion 60. The second curved portion 58 is between the second bracket coupling portion 56 and the second rod coupling portion 60.

Figure 10:
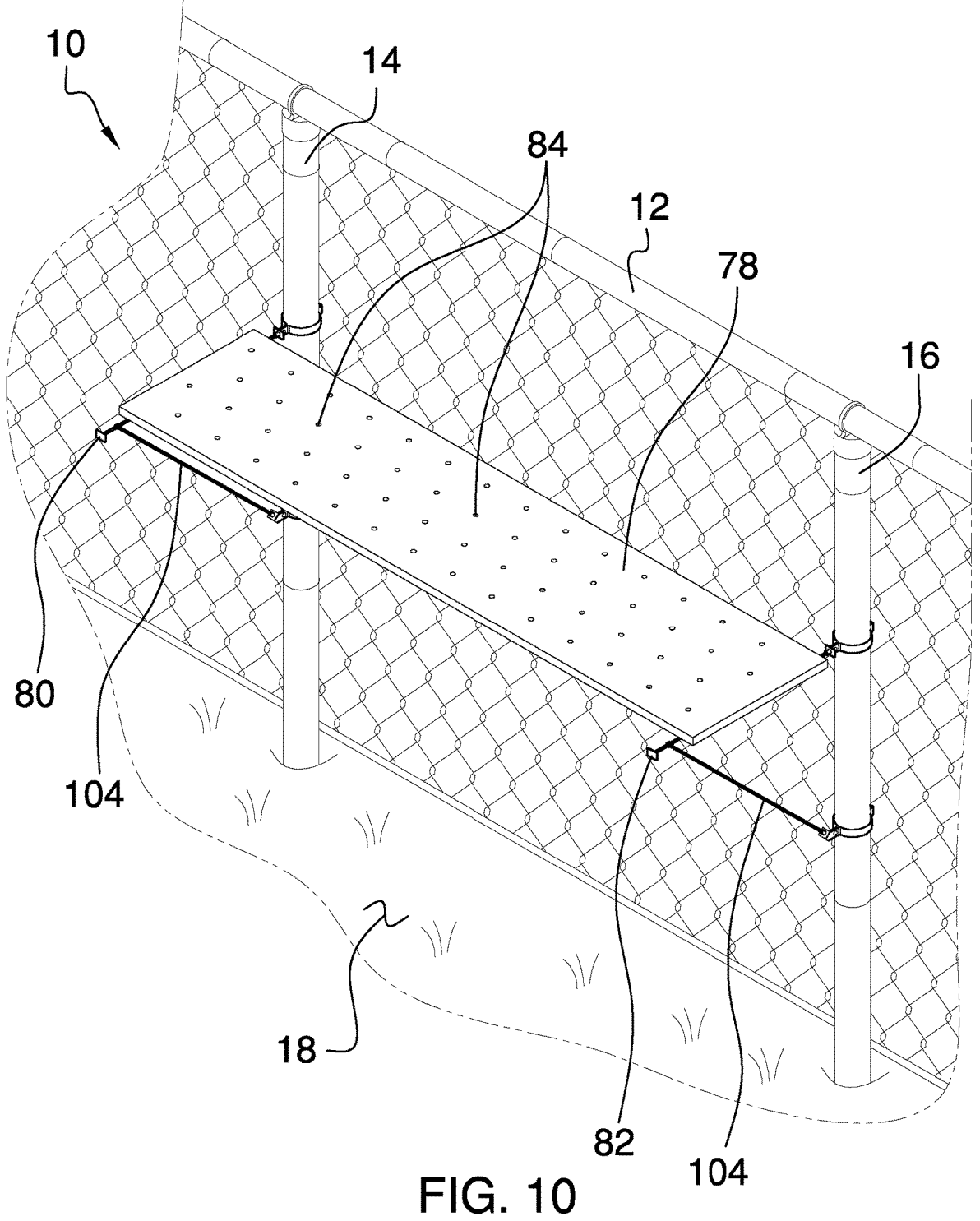
FIG. 10 is an in-use view of an embodiment of the disclosure.
Figure 11:
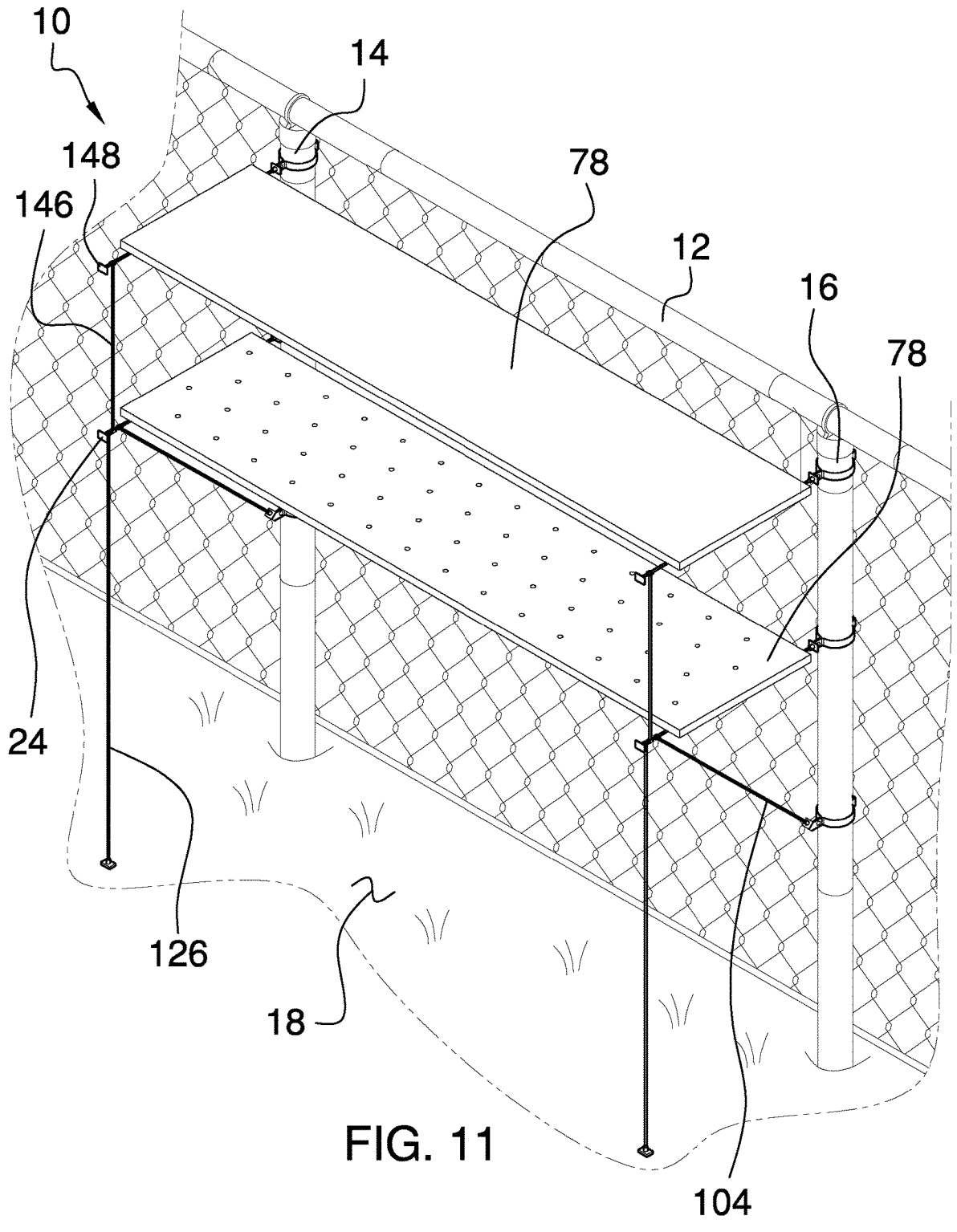
FIG. 11 is an in-use view of an embodiment of the disclosure.

The first 48 and second 58 curved portions encircle the respective one of the first and second fence posts 38 such that the first 46 and second 56 bracket coupling portions are positioned together and such that the first 50 and second 60 rod coupling portions are positioned together. In embodiments, the first 46 and second 56 bracket coupling portions may be positioned adjacent to the fence 12 and the first 50 and second 60 rod coupling portions may be positioned on the opposite side of the respective one of the first and second fence posts 38, as shown in FIGS. 10 and 11.

A first aperture 62 extends through the first rod coupling portion 50. A second aperture 64 extending through the second rod coupling portion 60. The second aperture 64 is aligned with the first aperture 62 when the first bracket 34 is coupled to the second bracket 36. A fence mount fastener 66 extends through the first 62 and second 64 apertures thereby coupling the first 34 and second 36 brackets together.

The first bracket coupling portion 46 has a shape that is complementary to a shape of the second bracket coupling portion 56 such that the first bracket coupling portion 46 engages the second bracket coupling portion 56 when the first bracket 34 is coupled to the second bracket 36. A stop 68 is coupled or attached to the first bracket coupling portion 46 to retain the first bracket coupling portion 46 against the second bracket coupling portion 56.

A fence mount liner 70 may be coupled to the inner side 42 of the first bracket 34 and the interior side 52 of the second bracket 36. The fence mount liner 70 is generally configured to increase friction between the first 34 and second 36 brackets and the respective one of the first and second fence posts 38. For example, the fence mount liner 70 may comprise a textured rubber or silicone material that is positioned on the first 48 and second 58 curved portions.

The first curved portion 48 may be convexly arcuate between the first bracket coupling portion 46 and the first rod coupling portion 50. The second curved portion 58 may be convexly arcuate between the second bracket coupling portion 56 and the second rod coupling portion 60. The first 34 and second 36 brackets are therefore configured to encircle the respective one of the first and second fence posts 38 between the first 48 and second 58 curved portions when the first bracket 34 and the second bracket 36 are mounted together around the respective one of the first and second fence posts 38.

A threaded rod receiver 72 may be coupled to and extend outwardly from the second rod coupling portion 60. The threaded rod receiver 72 may include a bracket threading 74. The first end portion 26 of the shelf rod 24 may have a rod threading 76 that is complementary to the bracket threading 74 such that the first end portion 26 engages the threaded rod receiver 72 thereby coupling the shelf rod 24 to the second bracket 36.

A platform 78 is positionable on the shelf rod 24. The platform 78 extends between a first shelf rod 80 extending outwardly from the first fence post 14 and a second shelf rod 82 extending outwardly from the second fence post 16. The platform 78 is configured to hold the object 22.

Figures 8, 9:
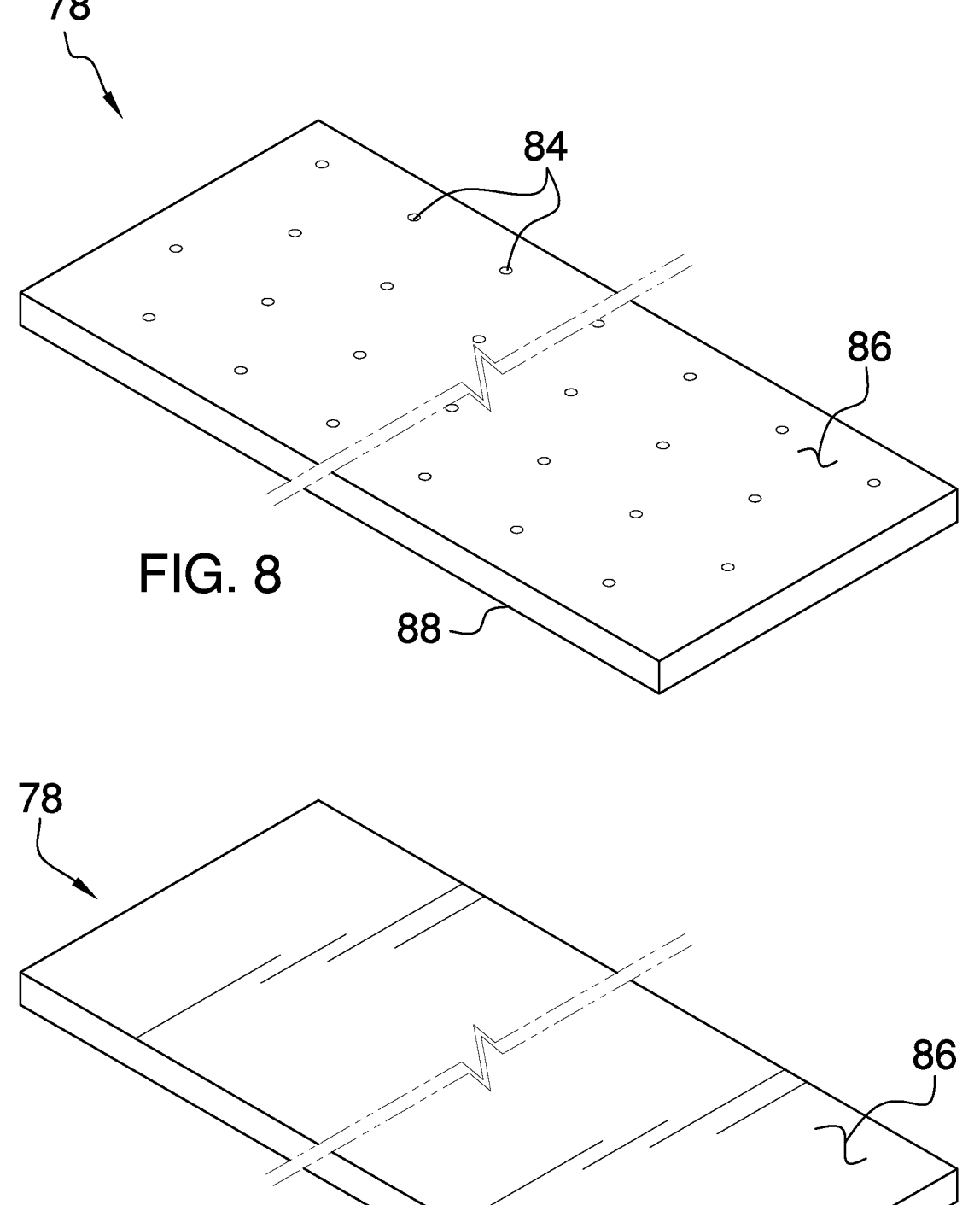
FIG. 8 is an isometric view of an embodiment of the disclosure.
FIG. 9 is an isometric view of an embodiment of the disclosure.

A plurality of holes 84 may extend through the platform 78. The plurality of holes 84 is configured to release a fluid being collected on the platform 78. As shown in FIGS. 8, 10, and 11, the plurality of holes 84 may extend from a top surface 86 of the platform 78 through a bottom surface 88 of the platform 78 whereby the plurality of holes 84 is configured to drain the fluid when the fluid collects on the top surface 86 of the platform 78.

A cross member 90 may be coupled to the shelf rod 24 and the respective one of the first and second fence posts 38. The cross member 90 is generally configured to increase the weight of the object 22 that can be supported by the shelving unit 20.

The cross member may include a third bracket 92 that is coupled to the first bracket 34. The third bracket 92 generally has an inside surface 94, an outside surface 96, a third bracket coupling portion 98, a third curved portion 100, and a third rod coupling portion 102. The third curved portion 100 is between the third bracket coupling portion 98 and the third rod coupling portion 102.

The first 48 and third 100 curved portions encircle the respective one of the first and second fence posts 38 such that the first 46 and third 98 bracket coupling portions are positioned together and such that the first 50 and third 102 rod coupling portions are positioned together. In embodiments, the first 46 and third 98 bracket coupling portions may be positioned adjacent to the fence 12 and the first 50 and third 102 rod coupling portions may be positioned on the opposite side of the respective one of the first and second fence posts 38, as shown in FIGS. 10 and 11.

A cross-member rod 104 is coupled to the third bracket 92. The cross-member rod 104 extends upwardly from the third bracket 92 to the shelf rod 24. A third aperture 106 extends through the third rod coupling portion 102. The third aperture 106 is aligned with the first aperture 62 when the first bracket 34 is coupled to the third bracket 92. A cross mount fastener 108 extends through the first 62 and third 106 apertures thereby coupling the first 34 and third 92 brackets together.

The third bracket coupling portion 98 has a shape that is complementary to the shape of the first bracket coupling portion 46 such that the first bracket coupling portion engages 46 the third bracket coupling portion 98 when the first bracket 34 is coupled to the third bracket 92. The stop 68 that is coupled to the first bracket coupling portion 46 retains the first bracket coupling portion 46 against the third bracket coupling portion 98.

A cross member liner 110 may be coupled to the inside surface 94 of the third bracket 92. The cross-member liner 110 is configured to increase friction between the third bracket 92 and the respective one of the first and second fence posts 38. For example, the cross-member liner 110 may comprise a textured rubber or silicone material that is positioned on the third curved portion 100.

The third curved portion 100 is convexly arcuate between the third bracket coupling portion 98 and the third rod coupling portion 102 whereby the first 34 and third 92 brackets are configured to encircle the respective one of the first and second fence posts 38 between the first 48 and third 100 curved portions when the first bracket 34 and the third bracket 92 are mounted together around the respective one of the first and second fence posts 38.

Embodiments of the cross-member rod 104 may generally include a member end portion 112 and a rod receiving portion 114. The rod receiving portion 114 is configured to engage a respective one of the plurality of notches 32 along the shelf rod 24. For example, the rod receiving portion 114 may include a curved trough 116 that can cradle the shelf rod 24. The curved trough 116 may have opposing lateral edges 118 that can engage the respective one of the plurality of notches 32 to retain the cross-member rod 104 in a particular position relative to the shelf rod 24.

Figure 6:
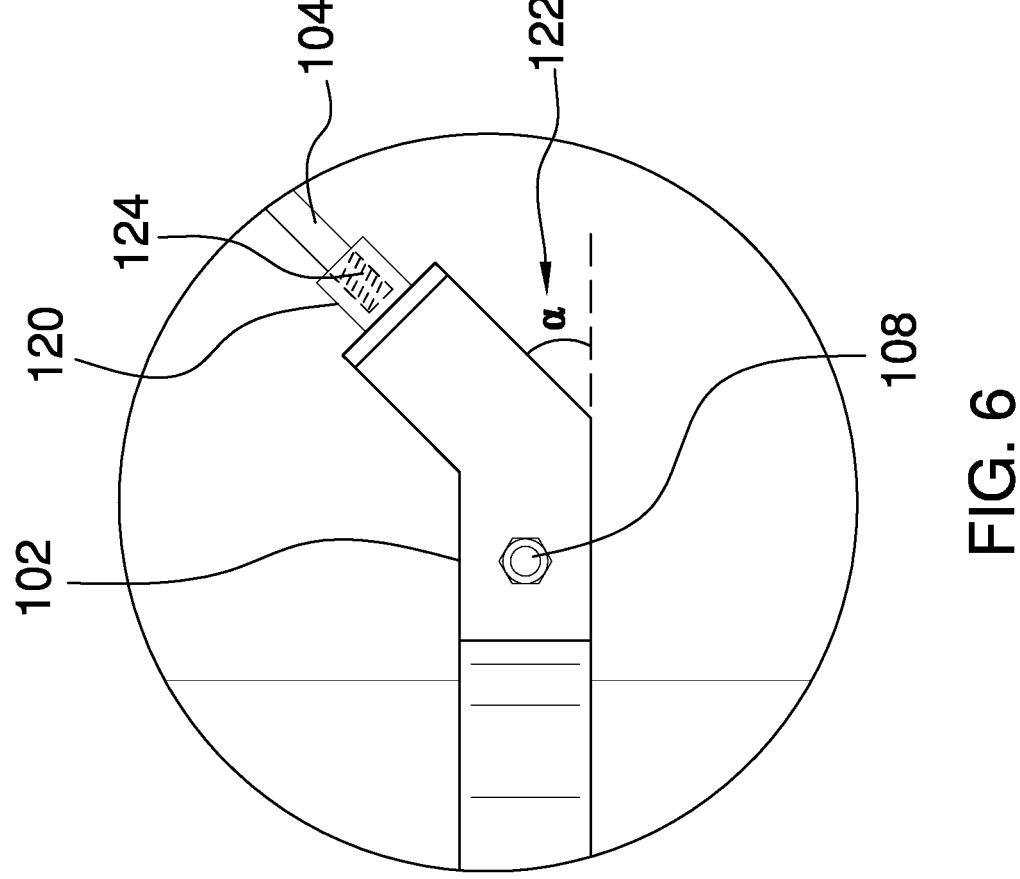
FIG. 6 is a detail view of an embodiment of the disclosure.

A threaded member receiver 120 may be coupled to and extend outwardly from the third rod coupling portion 102 of the third bracket 92. As shown in FIG. 6, the threaded member receiver 120 may be positioned at an angle 122 relative to the third rod coupling portion 102 such that the cross-member rod 104 extends between the third bracket 92 and the shelf rod 24. For example, the angle 122 may be between 35.0° and 55.0° so that the cross-member rod 104 extends upwardly from the threaded member receiver 120 to the shelf rod 24.

The threaded member receiver 120 includes the bracket threading 74. The member end portion 112 may include a member threading 124. The member threading 124 is complementary to the bracket threading 74 such that the member end portion 112 engages the threaded member receiver 120 thereby coupling the cross-member rod 104 to the third bracket 92.

The fence mounted shelving device 10 may also include a ground support rod 126 that is coupled to the shelf rod 24. The ground support rod 126 extends between the shelf rod 24 and the ground surface 18 whereby the ground support rod 126 is configured to increase the weight of the object 22 that can be supported by the shelving unit 20.

Embodiments of the ground support rod 126 may include a top portion 128 that engages the shelf rod 24. For example, the top portion 12 may include a U-shaped cradle 130 which can be positioned around the shelf rod 24 whereby the top portion 128 is configured to receive the shelf rod 24. The ground support rod 126 may also include a bottom portion 132 that is positionable on the ground surface 18. A middle portion 134 is coupled to and extends between the top 128 and bottom 132 portions.

A foot 136 may be coupled to the ground support rod 126 to stabilize the ground support rod 126 on the ground surface 18. The foot 136 may generally include a base panel 138 having a top side and a bottom side. A foot sleeve 140 may be coupled to and extend upwardly from the base panel 138. The foot sleeve 140 is configured to receive the bottom portion 132 of the ground support rod 126. For example, the foot sleeve 140 may have a foot threading 142 and the bottom portion 132 may have a ground support rod threading 144. The ground support rod threading 144 is complementary to the foot threading 142 such that the bottom portion 132 engages the foot sleeve 140 thereby coupling the ground support rod 126 to the foot 136.

Figure 7:
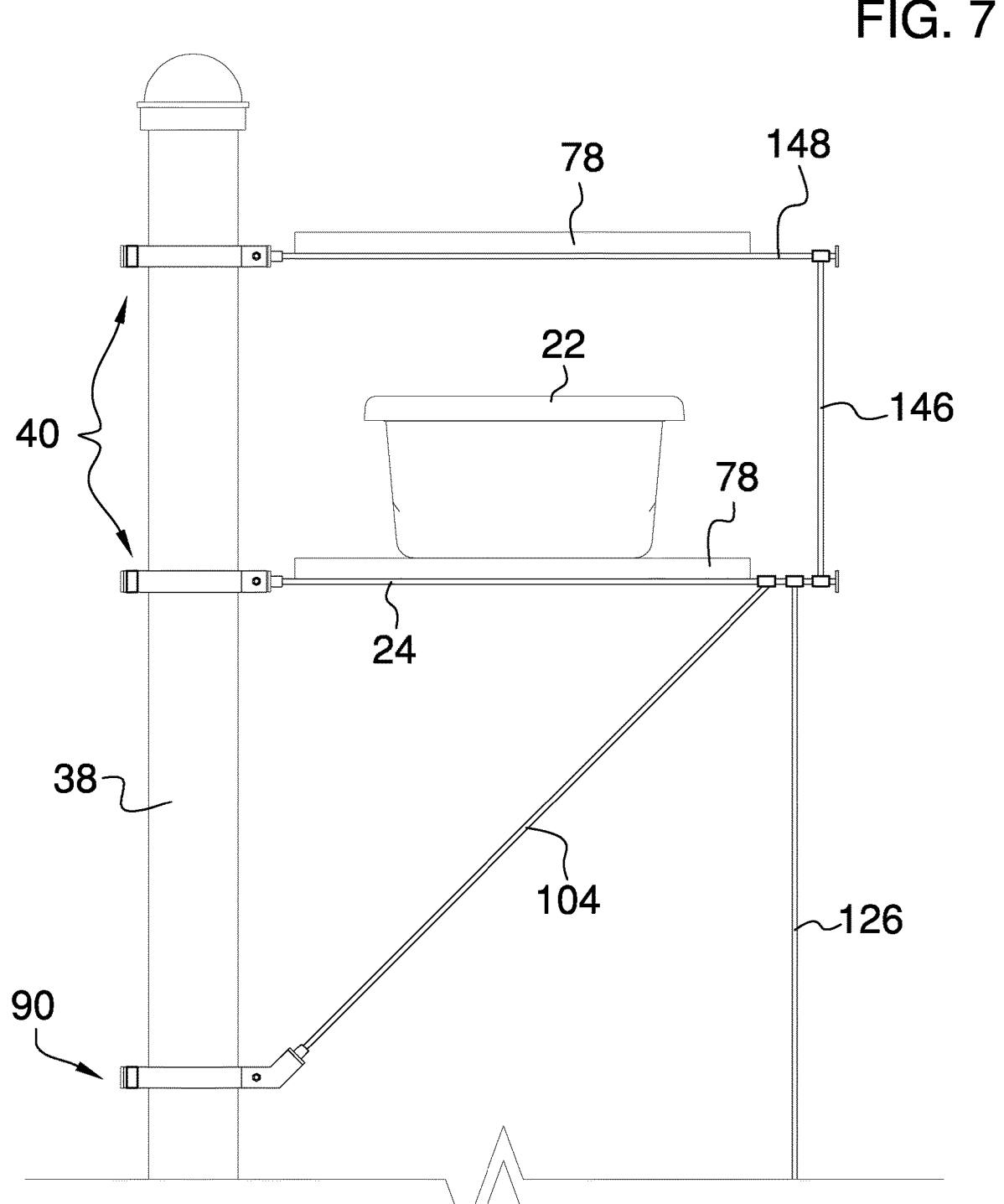
FIG. 7 is an in-use view of an embodiment of the disclosure.

Embodiments may also include a shelving support rod 146 that is coupled to the shelf rod 24. The shelving support rod 146 may extend vertically between the shelf rod 24 and an upper shelf rod 148 whereby the shelving support rod 146 is configured to increase the weight of the object 22 that can be supported by the shelving unit 20. The upper shelf rod 148 is vertically spaced from the shelf rod 24 relative to the fence 12, as shown in FIGS. 7 and 11.

The shelving support rod 146 generally includes a first coupler 150 that is configured to receive the shelf rod 24 and a second coupler 152 that is configured to receive the upper shelf rod 148. For example, the first 150 and second 152 couplers may comprise U-shaped retainers 156 that can receive or cradle the shelf rod 24 and the upper shelf rod 148, respectively. A midsection 154 is coupled to and extends between the first 150 and second 152 couplers.

In use, the fence mounted shelving device 10 can be installed on adjacent fence posts of a fence 12. The shelving unit 20 extends outwardly from the fence 12 to provide a storage area for the object 22 being placed on the platform 78. Because the shelving unit 20 is mounted to each of the first 14 and second 16 fence posts, the shelving unit 20 can support large or heavy objects. This weight capacity is, in part, because the first 14 and second 16 fence posts are cemented or otherwise mounted within the ground surface 18. With the cross member 90, the ground support rod 126, and the shelving support rod 146, the weight capacity can be further increased. A user can install the shelving unit 20 wherever it would be helpful to store the object 22. For example, the shelving unit 20 can be positioned along the fence 12 near a garden, to store gardening tools, or near a workstation, to store tools.

The components of the fence mounted shelving device 10 may be made from durable, weatherproof materials because the fence mounted shelving device 10 will typically be installed outdoors. For example, the components may include galvanized metal, steel, or hard plastics that can withstand prolonged exposure to natural elements such as sunlight, heat, rain, snow, cold, and wind.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A shelving system comprising:
a fence having a first fence post and a second fence post each being mounted within and extending upwardly from a ground surface;
a shelving unit being coupled to the first and second fence posts, the shelving unit extending outwardly from the fence whereby the shelving unit is configured to support a weight of an object over the ground surface between the first and second fence posts, the shelving unit further comprising:
a shelf rod having a first end portion and a second end portion;
a first bracket being coupled to a second bracket, the first and second brackets being coupled to a respective one of the first and second fence posts thereby forming a fence mount, the fence mount being coupled to the first end portion of the shelf rod such that the shelf rod extends outwardly from the respective one of the first and second fence posts over the ground surface;
the first bracket having an inner side, an outer side, a first bracket coupling portion, a first curved portion, and a first rod coupling portion, the first curved portion being between the first bracket coupling portion and the first rod coupling portion;
the second bracket having an interior side, an exterior side, a second bracket coupling portion, a second curved portion, and a second rod coupling portion, the second curved portion being between the second bracket coupling portion and the second rod coupling portion;
the first and second curved portions encircling the respective one of the first and second fence posts such that the first and second bracket coupling portions are positioned together and such that the first and second rod coupling portions are positioned together;

a stop being coupled to the first bracket coupling portion to retain the first bracket coupling portion against the second bracket coupling portion; and
a platform being positionable on the shelf rod, the platform extending between a first shelf rod extending outwardly from the first fence post and a second shelf rod extending outwardly from the second fence post, the platform being configured to hold the object.

2. The shelving system of claim 1, the shelf rod further comprising a plate being coupled to the second end portion of the shelf rod, the plate extending outwardly from the shelf rod.

3. The shelving system of claim 1, wherein the second end portion of the shelf rod has a plurality of notches being spaced from each other along a length of the shelf rod.

4. The shelving system of claim 1, the fence mount further comprising:
a first aperture extending through the first rod coupling portion;
a second aperture extending through the second rod coupling portion, the second aperture being aligned with the first aperture when the first bracket is coupled to the second bracket; and
a fence mount fastener extending through the first and second apertures thereby coupling the first and second brackets together.

5. The shelving system of claim 1, wherein the first bracket coupling portion has a shape being complementary to a shape of the second bracket coupling portion such that the first bracket coupling portion engages the second bracket coupling portion when the first bracket is coupled to the second bracket.

6. The shelving system of claim 1, further comprising a fence mount liner being coupled to the inner side of the first bracket and the interior side of the second bracket, the fence mount liner being configured to increase friction between the first and second brackets and the respective one of the first and second fence posts.

7. The shelving system of claim 1, further comprising:
a threaded rod receiver being coupled to and extending outwardly from the second rod coupling portion, the threaded rod receiver having a bracket threading; and
the first end portion of the shelf rod having a rod threading, the rod threading being complementary to the bracket threading such that the first end portion engages the threaded rod receiver thereby coupling the shelf rod to the second bracket.

8. The shelving system of claim 1, further comprising a plurality of holes extending through the platform, the plurality of holes being configured to release a fluid being collected on the platform.

9. The shelving system of claim 1, further comprising a cross member being coupled to the shelf rod and the respective one of the first and second fence posts, the cross member being configured to increase the weight which can be supported by the shelving unit.

10. The shelving system of claim 9, the cross member further comprising:
a third bracket being coupled to a second one of the first bracket, the third bracket having an inside surface, an outside surface, a third bracket coupling portion, a third curved portion, and a third rod coupling portion, the third curved portion being between the third bracket coupling portion and the third rod coupling portion;
the first and third curved portions encircling the respective one of the first and second fence posts such that the first and third bracket coupling portions are positioned together and such that the first and third rod coupling portions are positioned together; and a cross-member rod being coupled to the third bracket, the cross-member rod extending upwardly from the third bracket to the shelf rod.

11. The shelving system of claim 10, the cross member further comprising:

a third aperture extending through the third rod coupling portion, the third aperture being aligned with the first aperture when the second one of the first bracket is coupled to the third bracket; and a cross mount fastener extending through the first and third apertures thereby coupling the second one of the first bracket and the third bracket together.

12. The shelving system of claim 10, further comprising:

the third bracket coupling portion having a shape being complementary to the shape of the first bracket coupling portion such that the first bracket coupling portion engages the third bracket coupling portion when the second one of the first bracket is coupled to the third bracket; and wherein the stop coupled to the first bracket coupling portion retains the first bracket coupling portion against the third bracket coupling portion.

13. The shelving system of claim 10, the cross-member rod further comprising a member end portion and a rod receiving portion, the rod receiving portion being configured to engage a respective one of a plurality of notches being positioned along a length of the shelf rod.

14. The shelving system of claim 13, further comprising a threaded member receiver being coupled to and extending outwardly from the third rod coupling portion, the threaded member receiver having a bracket threading, and the member end portion further comprising a member threading, the member threading being complementary to the bracket threading such that the member end portion engages the threaded member receiver thereby coupling the cross-member rod to the third bracket.

15. The shelving system of claim 14, wherein the threaded member receiver is positioned at an angle relative to the third rod coupling portion.

16. The shelving system of claim 15, wherein the angle is between 35.0° and 55.0°.

17. The shelving system of claim 1, further comprising a ground support rod being coupled to the shelf rod, the ground support rod extending between the shelf rod and the ground surface whereby the ground support rod is configured to increase the weight which can be supported by the shelving unit, the ground support rod including:

a top portion engaging the shelf rod;

a bottom portion being positionable on the ground surface; and a middle portion being coupled to and extending between the top and bottom portions.

18. The shelving system of claim 17, further comprising a foot being coupled to the ground support rod, the foot including:

a base panel; and a foot sleeve being coupled to and extending upwardly from the base panel, the foot sleeve being configured to receive the bottom portion of the ground support rod.

19. The shelving system of claim 1, further comprising a shelving support rod being coupled to the shelf rod, the shelving support rod extending vertically between the shelf rod and an upper shelf rod whereby the shelving support rod is configured to increase the weight which can be supported by the shelving unit, the upper shelf rod being vertically spaced from the shelf rod relative to the fence, the shelving support rod including:

a first coupler engaging the shelf rod;

a second coupler engaging the upper shelf rod; and a midsection being coupled to and extending between the first and second couplers.

20. A shelving system comprising:

a fence having a first fence post and a second fence post each being mounted within and extending upwardly from a ground surface, the first fence post being spaced from the second fence post;

a shelving unit being coupled to the first and second fence posts, the shelving unit extending outwardly from the fence whereby the shelving unit is configured to support a weight of an object over the ground surface between the first and second fence posts, the shelving unit further comprising:

a shelf rod having a first end portion and a second end portion, the shelf rod including:

a plate being coupled to the second end portion of the shelf rod, the plate extending outwardly from the shelf rod;

wherein the second end portion has a plurality of notches, each of the plurality of notches being spaced from the others along a length of the shelf rod by between 1.0 inches and 3.0 inches, an innermost one of the plurality of notches being positioned between 7.0 inches and 9.0 inches from the first end portion, an outermost one of the plurality of notches being positioned 11.0 inches and 13.0 inches from the first end portion, the outermost one of the plurality of notches being adjacent to the plate;

a first bracket being coupled to a second bracket, the first and second brackets being coupled to a respective one of the first and second fence posts thereby forming a fence mount, the fence mount being coupled to the first end portion of the shelf rod such that the shelf rod extends outwardly from the respective one of the first and second fence posts over the ground surface;

the first bracket having an inner side, an outer side, a first bracket coupling portion, a first curved portion, and a first rod coupling portion, the first curved portion being between the first bracket coupling portion and the first rod coupling portion;

the second bracket having an interior side, an exterior side, a second bracket coupling portion, a second curved portion, and a second rod coupling portion, the second curved portion being between the second bracket coupling portion and the second rod coupling portion;

the first and second curved portions encircling the respective one of the first and second fence posts such that the first and second bracket coupling portions are positioned together and such that the first and second rod coupling portions are positioned together;

a first aperture extending through the first rod coupling portion;

a second aperture extending through the second rod coupling portion, the second aperture being aligned with the first aperture when the first bracket is coupled to the second bracket;

a fence mount fastener extending through the first and second apertures thereby coupling the first and second brackets together;

the first bracket coupling portion having a shape being complementary to a shape of the second bracket coupling portion such that the first bracket coupling portion engages the second bracket coupling portion when the first bracket is coupled to the second bracket;

a stop being coupled to the first bracket coupling portion to retain the first bracket coupling portion against the second bracket coupling portion;

a fence mount liner being coupled to the inner side of the first bracket and the interior side of the second bracket, the fence mount liner being configured to increase friction between the first and second brackets and the respective one of the first and second fence posts;

the first curved portion being convexly arcuate between the first bracket coupling portion and the first rod coupling portion, the second curved portion being convexly arcuate between the second bracket coupling portion and the second rod coupling portion, whereby the first and second brackets are configured to encircle the respective one of the first and second fence posts between the first and second curved portions when the first bracket and the second bracket are mounted together around the respective one of the first and second fence posts;

a threaded rod receiver being coupled to and extending outwardly from the second rod coupling portion, the threaded rod receiver having a bracket threading;

the first end portion of the shelf rod having a rod threading, the rod threading being complementary to the bracket threading such that the first end portion engages the threaded rod receiver thereby coupling the shelf rod to the second bracket;

a platform being positionable on the shelf rod, the platform extending between a first shelf rod extending outwardly from the first fence post and a second shelf rod extending outwardly from the second fence post, the platform being configured to hold the object;

a plurality of holes extending through the platform, the plurality of holes being configured to release a fluid being collected on top of the platform;

a cross member being coupled to the shelf rod and the respective one of the first and second fence posts whereby the cross member is configured to increase the weight which can be supported by the shelving unit, the cross member comprising:

a third bracket being coupled to a second one of the first bracket, the third bracket having an inside surface, an outside surface, a third bracket coupling portion, a third curved portion, and a third rod coupling portion, the third curved portion being between the third bracket coupling portion and the third rod coupling portion;

the first and third curved portions encircling the respective one of the first and second fence posts such that the first and third bracket coupling portions are positioned together and such that the first and third rod coupling portions are positioned together;

a cross-member rod being coupled to the third bracket, the cross-member rod extending upwardly from the third bracket to the shelf rod;

a third aperture extending through the third rod coupling portion, the third aperture being aligned with the first aperture when the second one of the first bracket is coupled to the third bracket;

a cross mount fastener extending through the first and third apertures thereby coupling the second one of the first bracket and the third bracket together;

the third bracket coupling portion having a shape being complementary to the shape of the first bracket coupling portion such that the first bracket coupling portion engages the third bracket coupling portion when the second one of the first bracket is coupled to the third bracket;

the stop coupled to the first bracket coupling portion retaining the first bracket coupling portion against the third bracket coupling portion;

a cross member liner being coupled to the inside surface of the third bracket, the cross member liner being configured to increase friction between the third bracket and the respective one of the first and second fence posts;

the third curved portion being convexly arcuate between the third bracket coupling portion and the third rod coupling portion whereby the second one of the first bracket and the third bracket are configured to encircle the respective one of the first and second fence posts between the first and third curved portions when the second one of the first bracket and the third bracket are mounted together around the respective one of the first and second fence posts;

the cross-member rod having a member end portion and a rod receiving portion, the rod receiving portion being configured to engage a respective one of the plurality of notches along the shelf rod;

the third rod coupling portion having a threaded member receiver being coupled to and extending outwardly from the third rod coupling portion, the threaded member receiver having the bracket threading, the threaded member receiver being positioned at an angle relative to the third rod coupling portion, the angle being between 35.0° and 55.0°;

the member end portion having a member threading, the member threading being complementary to the bracket threading such that the member end portion engages the threaded member receiver thereby coupling the cross-member rod to the third bracket;

a ground support rod being coupled to the shelf rod, the ground support rod extending between the shelf rod and the ground surface whereby the ground support rod is configured to increase the weight which can be supported by the shelving unit, the ground support rod including:

a top portion being configured to receive the shelf rod;

a bottom portion being positionable on the ground surface;

a middle portion being coupled to and extending between the top and bottom portions;

a foot being coupled to the ground support rod, the foot including:

a base panel;

a foot sleeve being coupled to and extending upwardly from the base panel, the foot sleeve being configured to receive the bottom portion of the ground support rod;

a shelving support rod being coupled to the shelf rod, the shelving support rod extending vertically between the shelf rod and an upper shelf rod whereby the shelving support rod is configured to increase the weight which can be supported by the shelving unit, the upper shelf rod being vertically spaced from the shelf rod relative to the fence, the shelving support rod including:

a first coupler being configured to receive the shelf rod;

a second coupler being configured to receive the upper shelf rod; and a midsection being coupled to and extending between the first and second couplers.

\* \* \* \* \*